Jan. 4, 1927.

R. E. LAUCK 1,613,112

AUTOMATIC CONTROL FOR THE IGNITION CIRCUITS OF MOTOR PROPELLED VEHICLES

Filed April 26, 1921

INVENTOR
R. E. Lauck.

Atty.

Patented Jan. 4, 1927.

1,613,112

UNITED STATES PATENT OFFICE.

ROBERT EDWIN LAUCK, OF TAYLOR, TEXAS.

AUTOMATIC CONTROL FOR THE IGNITION CIRCUITS OF MOTOR-PROPELLED VEHICLES.

Application filed April 26, 1921. Serial No. 464,746.

This invention relates to an improvement in automatic controls for the ignition circuit of a motor propelled vehicle, such for instance as a tractor, providing particularly for a short circuiting of the ignition circuit in the event the tractor tends to tilt backward to a dangerous degree.

In certain types of tractors now in use, there is a tendency on the part of the tractor to tilt backward in the event of an unusual resistance to the movement of the implement the tractor is drawing, and serious accidents to the drivers have resulted from this backward turning of the tractor. Of course this backward tilting of the tractor results from the continued application of power after the tractor has been brought to a stop through the obstruction in the path of the implement drawn by the tractor, and if the power of the tractor can be cut off in the event of a backward tilting of the tractor, and before such tilting reaches a dangerous angle, the normal weight of the tractor will at once return it to a proper position. Of course the tilting of the tractor results so quickly following the meeting of the obstruction, that the driver does not have time to cut off the ignition switch, and hence the cutting off of the ignition circuit must be automatic and must occur on a predetermined tilting of the tractor less than that which would result in an overturning.

The present invention is therefore directed to a means for automatically short circuiting the ignition circuit in a predetermined tilting of the tractor, to thereby cut off the power and permit the tractor to resume a normal position.

The invention is illustrated in the accompanying drawings, in which:—

Figure 1:
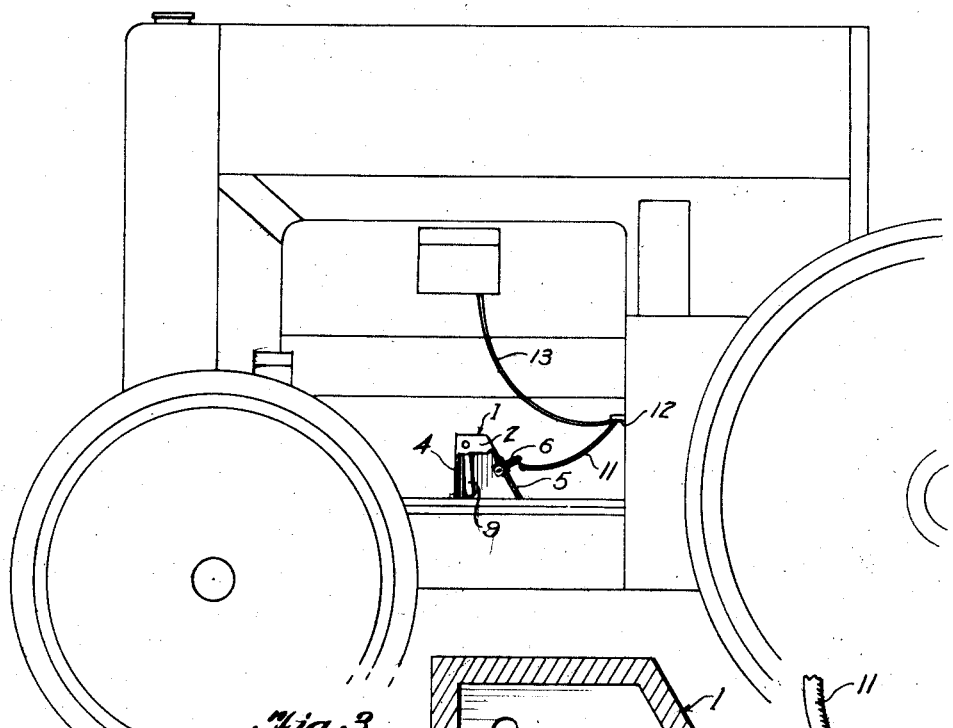
Fig. 1 is a view in elevation showing sufficient of a tractor to illustrate the application of the improvement thereto.
Figure 3:
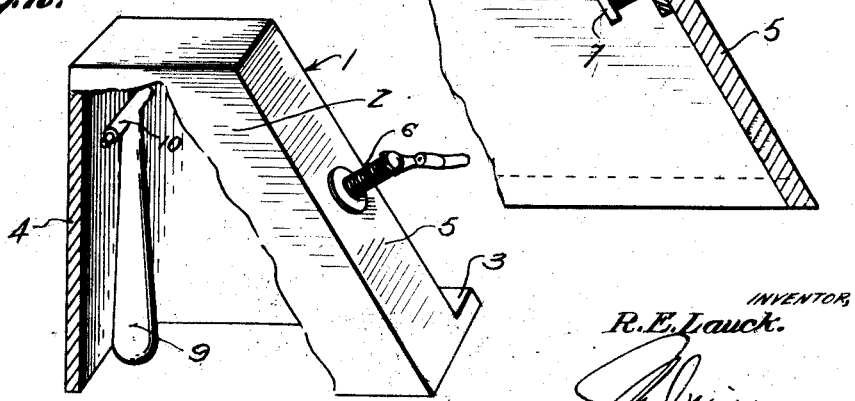
Fig. 3 is a sectional view through the casing and contact member.
Figure 2:
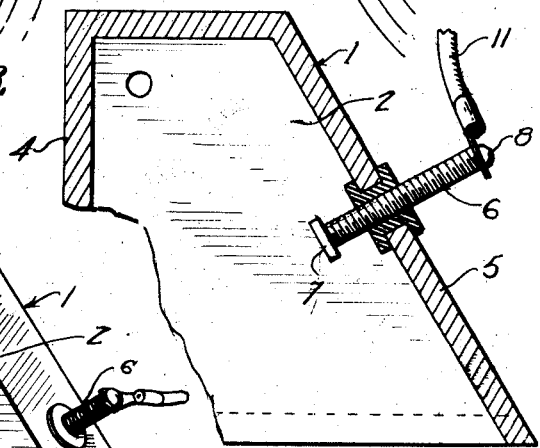
Fig. 2 is an enlarged perspective view of the movable contact member and casing therefor.

The improved automatic control comprises a casing 1, constructed of metal and having spaced substantially parallel side walls 2, the lower end of the inner of which is preferably provided with a lateral extension 3 by which the casing may be bolted or otherwise secured to an appropriate part of the engine or frame of the tractor. The forward end wall 4 of the casing is at right angles to the top of the casing, or in such position as to be substantially vertical when the tractor is in normal position. The rear wall 5 of the casing is inclined downwardly and rearwardly from the top, being thus at an inclination to the plane of the forward wall 4.

A contact pin 6 is passed through and secured in the wall 5 of the casing, this pin 6 being insulated from the wall 5 and having a head portion 7 projecting inwardly of and slightly beyond the wall 5. The outer or rear end of the pin 6 is formed at 8 to permit the convenient connection of an electric conductor thereto.

A contact member 9 is movably supported within the casing, being preferably in the form of a pendulum from a shaft 10 mounted in bearings of any appropriate form in the side walls 2. The pendulum is so mounted that in its normal or vertical position, it will rest closely adjacent the forward wall 4 of the casing, so that its swing in the forward direction is prevented by the wall 4. The length of the pendulum is such that in its rearward swing, it will contact with the head 7 of the pin 6.

The pin 6 is connected as by conductor 11 to one of the main circuiting wires of the ignition system, being here shown connected to the magneto post 12 for distributing current through conductor 13 from the magneto to the coil box. Obviously any circuiting wire of the ignition system, other than a ground wire, may be shunted through the post 6 to short circuit the current through that wire in the operation of the automatic control.

From the description it will be obvious that normally the contact pin 6 is insulated from the ground, as the pendulum is substantially vertical and away from the post. In the event the tractor tilts rearward however, the swing of the pendulum engages the post 6, the current through the wire 11 is immediately grounded through the casing 1 and the engine or frame of the tractor, the ignition circuit is broken, and the engine stops. The tractor then relieved of power returns by its own weight to a normal position.

It is of course to be understood that the relation of the art of movement of the pendulum intersecting the pin 6 occurs on an inclination of the tractor less than a dangerous inclination for overturning, and hence the inclination of the wall 5 will be that best adapted for the particular degree of inclination determined as the maximum minute of safety. This of course can be arranged as desired in the particular machine, or if preferred, the pin 6 may be adjustable to cause the head 7 to project more or less into the casing 1, to thus determine the operative limit of inclination of the automatic control. The vertical wall 4 of the casing prevents the forward swing of the pendulum, and hence there is no liability of the continued gravital movement of the pendulum following the initial operation.

The device as a whole may be readily and quickly applied to any appropriate part of the tractor, so long as the casing is electrically connected to the metallic part of the vehicle and arranged to permit the pendulum to respond to a rearward tip of the vehicle.

I claim:

An automatic ignition circuit control for tractors, including a casing electrically connected with the frame of the tractor and having, when in applied position, one vertical wall and an opposing inclined wall, a pin mounted in and insulated from said inclined wall and having a conductor leading therefrom and connected in the ignition circuit, and a pendulum pivotally mounted in the casing immediately adjacent the vertical wall thereof to cause the lower end of the pendulum to substantially contact with said vertical wall under normal conditions, said pendulum being adapted to swing toward the inclined wall and into contact with said pin on a predetermined tilting of the tractor, the support of the pendulum relative to the vertical wall of the casing preventing opposite swing of the pendulum and serving to bring the pendulum immediately to rest following its initial swing toward and from the inclined wall.

In testimony whereof I affix my signature.

ROBERT EDWIN LAUCK.